United States Patent
Cardona

(10) Patent No.: US 8,316,061 B2
(45) Date of Patent: Nov. 20, 2012

(54) SYSTEM, METHOD AND COMPUTER PROGRAM PRODUCT FOR MANAGING AND TRACKING TECHNICAL EVENTS ASSOCIATED WITH PRODUCTION OF A PRODUCT

(75) Inventor: Jean-Michel Cardona, Saint-Lys (FR)

(73) Assignee: Airbus Operations SAS, Toulouse (FR)

( * ) Notice: Subject to any disclaimer, the term of this patent is extended or adjusted under 35 U.S.C. 154(b) by 207 days.

(21) Appl. No.: 11/626,909

(22) Filed: Jan. 25, 2007

(65) Prior Publication Data
US 2008/0183749 A1    Jul. 31, 2008

(51) Int. Cl.
*G06F 17/30* (2006.01)
(52) U.S. Cl. .................. 707/802; 707/803; 707/805
(58) Field of Classification Search .......... 705/7, 26–27; 707/104.1, 802, 803, 805
See application file for complete search history.

(56) References Cited

U.S. PATENT DOCUMENTS

| | | | | |
|---|---|---|---|---|
| 6,574,537 | B2 * | 6/2003 | Kipersztok et al. | 701/29 |
| 6,885,921 | B1 * | 4/2005 | Farmer | 701/29 |
| 6,901,377 | B1 * | 5/2005 | Rosenfeld et al. | 705/26 |
| 7,127,409 | B2 * | 10/2006 | Denning et al. | 705/7 |
| 7,206,771 | B2 * | 4/2007 | Alvarez et al. | 706/45 |
| 2006/0293906 | A1 * | 12/2006 | Wilson et al. | 705/1 |

* cited by examiner

*Primary Examiner* — Huawen Peng
(74) *Attorney, Agent, or Firm* — Oblon, Spivak, McClelland, Maier & Neustadt, L.L.P.

(57) ABSTRACT

A system for production which includes a database configured to store information about technical events and a server to provide centralized management of the information. The database is configured to be accessed by several end-users connected to the database via a network. A web-based graphical user interface is configured to display, at the end-user, quality assurance information relating to the technical events associated with the production of aircraft and aircraft-related components.

14 Claims, 4 Drawing Sheets

| Status of Event | Create an Event | Search Events | Export an Event | | | | |
|---|---|---|---|---|---|---|---|
| 109 Number | 111 Criticality | 113 Status | 115 Project | 117 Product | 119 Origin | 121 Cost | 107 123 Date of treatment | 125 Disposition |
| 22108 | 0 | Initialized | Project P3 | Product 1 | | 0 | |
| 22114 | 0 | Initialized | Project P1 | Product 2 | | 0 | |
| 22119 | 180 | Pending | Project P1 | Product 3 | | 0 | 10/10/2006 |
| 22120 | 126 | Pending | Project P4 | Product 4 | | 0 | 17/10/2006 |
| 22118 | 90 | Pending | Project P2 | Product 5 | | 0 | 03/10/2006 |
| 22121 | 126 | Corrected Long Term | Project P5 | Product 6 | | 0 | 05/09/2006 |
| 22122 | 54 | Surveillance | Project 6 | Product 7 | | 0 | 04/07/2006 |

*Fig. 2*

SYSTEM, METHOD AND COMPUTER PROGRAM PRODUCT FOR MANAGING AND TRACKING TECHNICAL EVENTS ASSOCIATED WITH PRODUCTION OF A PRODUCT

BACKGROUND OF THE INVENTION

1. Field of the Invention

The present invention relates generally to a system, method, and computer program product for managing, monitoring and tracking technical events associated with the production of products, such as an aircraft and aircraft related components.

2. Description of the Related Art

Modern corporate departments in charge of producing products currently follow-up on technical events and corrective actions through multiple paper files. These files are updated at the end of the commissions period and then are dispersed to the participants of a given project. After the participants receive the updated files, the participants then prepare their solutions to the problems mentioned in the files. The prepared solutions to the problems are then shared with other participants at a company meeting and the solutions are given orally.

One of the problems associated with the current methodology is that the oral conveyance of information among participants of a given project can create distortions in the information shared among the various participants. Further, it is difficult to share a given action plan for a particular problem because the information is not centralized. Thus, it becomes difficult for management to cross-check information among various participants in order to make sure that they all have the same information or solution to a particular problem.

SUMMARY OF THE INVENTION

Accordingly, an object of the present invention is to provide a novel system, method, and computer program product for monitoring and tracking technical events associated with the production of aircraft and aircraft related components via a web-based system.

In a first embodiment, the system includes a database configured to store information about technical events and to provide centralized management of the information. The database is configured to be accessed by several end-users connected to the database via a network. A web-based graphical user interface is configured to display, at the end-user, quality assurance information relating to the technical events associated with the production of aircraft and aircraft-related components.

The first embodiment can further include a server connected to the network that manages quality assurance information including, for example: a case number, a critical number, status information about one of the technical events, an origin of one or many technical events, cost associated with the technical event(s), and disposition of the technical events. The web-based graphical user interface can be configured to display a status of corrective action for the technical events. The web-based graphical user interface can further be configured to arrange and display the technical events in order of importance. The order of importance of the technical events can be determined by the critical number, the critical number being determined by the frequency of one of the technical events, the severity of the technical event(s), and the detectability of the technical event(s). After a technical event is cured, the critical number can be decreased, and the web-based graphical user interface displays an updated critical number.

In a second embodiment, a method includes the following steps, which can be performed, for example, at the server using a computer program product: receiving information about technical events from the end-user; transmitting the information about the technical events to the database; receiving a request for the information about the technical events from another end-user; retrieving the information about the technical events from the database; and providing the information about the technical events from the database to another end-user via a network.

The second embodiment further includes providing to the end-user quality assurance information including, the case number, the critical number, the status of one of the technical events, the origin of technical event(s), cost associated with the technical event(s), and disposition of the technical event(s). The second embodiment can also include providing to the end-user a status of corrective action for the technical events and providing to the end-user the information about the technical events arranged in order of importance.

The second embodiment can also include determining the order of importance of the technical events based on the critical number determined by the frequency of the technical events, the severity of the technical event, and the detectability of the technical event. In addition, the second embodiment can further include decreasing the critical number after the technical event is cured and providing to the end-user an updated critical number after the one technical defect is cured.

In a third embodiment, a computer program product is configured to store program instructions for execution on a computer system, for example at the server, enabling the computer system to perform the steps of the above-mentioned method.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 illustrates a screen shot of an embodiment of the present invention.

DETAILED DESCRIPTION OF THE PREFERRED EMBODIMENTS

Figure 1:
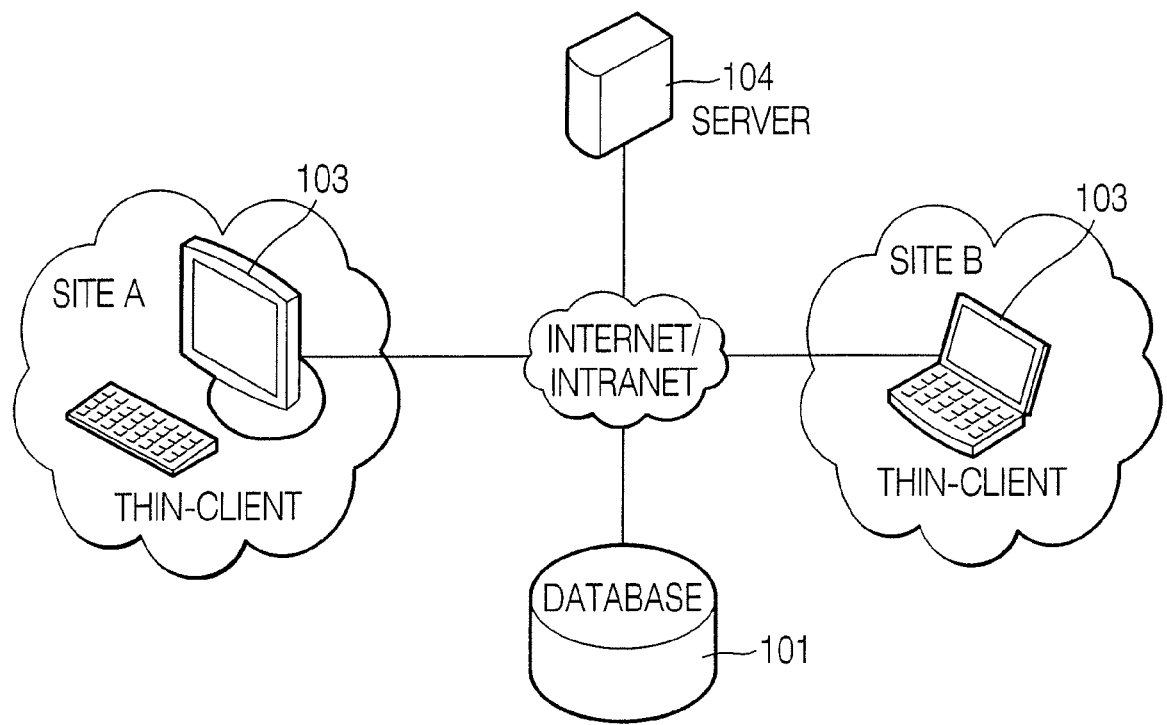
FIG. 1 illustrates a diagram of the software and hardware architecture for an embodiment of the present invention.

The present invention allows for the monitoring and tracking of technical events associated with the production of aircraft and aircraft related components via a web-based system. The web-based system is created to solve the problems associated with the exploitation of standard office files within the framework of managing technical events and their corresponding action plans. A technical event can be, for example, a manufacturing defect, a design defect, a recurring maintenance problem, or a mechanical failure encountered under normal operating conditions.

An embodiment of the present invention can be configured to allow for: centralized management of treatments for technical events or defects, structuring of action plans (expertise, curative, corrective measure), a synergistic overview of a multitude of technical events, facilitating the exchange of information during periodic employee meetings, and the storage of information relating to the detailed history of particular technical events and allowing an individual to research similar cases and/or technical events.

Because the web-based system can be accessed via a network, such as the internet or intranet, it can be accessed simultaneously by several people. Technicians, managers, engineers, etc. can thus answer questions pertaining to technical events from their work station, at home, or any where else a person can connect to the internet, for example via handheld devices and wireless connections.

Also, because the web-based system utilizes a database, individuals have the ability to create their own requests. Other benefits of the present invention can include: improved reaction times to the treatment of problems; providing a mechanism for facilitating the decision-making process (i.e. whether or not the company wants to correct a particular technical event or defect); the ability to determine the criticality of a problem and consequently to adapt the amount of energy to be devoted to the treatment of a particular technical event or defect (i.e. managing priorities); reducing the time spent in periodic meetings, increasing the reliability of information pertaining to a particular technical event because the information is stored in a centralized location and the information is dynamic; and the web-based system solicits participation from employees in the drafting of action plans during employee meetings.

The present invention can also make it possible to view the various technical events associated with a particular project, while also having the ability to view which projects are experiencing a particular technical event or defect. This function allows a particular technical event occurring in several different activities to be dealt with and corrected only once.

Another aspect of the present invention is the ability to easily transfer information relating to a particular technical event among different departments. Often times, certain problems need to be transferred to specialized departments in order for the technical event to be dealt with properly. The present invention allows this transfer of information to be easily carried out.

An aspect of an embodiment of the present invention is the prevention of duplicative efforts. When a new treatment in the web-based system is inputted, a link is created between the database and the technical event. This link makes it possible to have highly reliable technical data about technical events (products impacted, type of problem, the wording of the problem, etc.).

In an embodiment of the present invention, several treatments can be viewed simultaneously. These treatments can be, for example, classified in order of criticality. This allows the most disturbing technical events to be viewed quickly. The criticality of a given technical event can be calculated from different criteria. For example the following criteria can be used: detectability, frequency, and the severity of the technical event. However, it is envisioned that other criteria could be used as well. As the treatment process of a given technical event progresses, the criticality associated with the technical event decreases.

An embodiment of the present invention has the ability to structure action plans (i.e. expertise, curative actions, and corrective actions) in response to a particular technical event.

An action plan relating to the treatment of a technical event can quickly become complex and consequently lose its legibility. However, the present invention makes it possible to set up structured action plans standardizing the decisions to be made during the treatment of technical events.

Next, several exemplary action plans of an embodiment of the present invention are described. One action plan is called the "examination" action plan. The examination action plan contains research information about the root cause of a technical event, the context of the technical event, and an analysis of the risk associated with the technical event. A second action plan is called the "curative" action plan. The curative action plan allows treatments that have been successful or useful to be tracked, while also noting treatments that have not been successful. If a corrective action is "curative," this means that the particular instance of the technical event or defect in the product, component, etc. has been corrected.

A third action plan is called the "corrective measure" action plan. The corrective measure action plan displays how to correct the root cause of the technical event. In contrast to a curative measure, a corrective measure corrects the technical event at the source so that all future products, components, etc. will be free of the previous technical event or defect.

A fourth action plan is called the "surveillance" action plan. The surveillance action plan measures the effectiveness of the corrective and curative actions that have been utilized. The possibility of adding predefined objectives during the treatment of technical events is also envisioned.

In large corporations, periodic review meetings in which action plans are followed up on are necessary in order to guarantee the advanced treatment of technical events. An embodiment of the present invention is designed to facilitate the treatment of technical events during the meeting. When the web-based system of the present invention is used in conjunction with a video-projector during meetings, the web-based system can list and display technical events needing treatment instantaneously, listed in order of decreasing criticality. Further, all of the participants (e.g. employees) can contribute to the development of an action plan dealing with a particular technical event because the action plan can then be immediately displayed and modified. When following-up on actions, an organizer and his collaborators can identify planned actions the day of the meeting. Further, the web-based system makes it possible to view the answers to actions before the meeting even occurs. Because the system is web-based, the participants of the meeting need not be physically present at the same location, but can attend and participate from remote locations using network connections.

During a periodic review meeting, each participant has the ability to answer the actions which are assigned to him from his work station. The actions requested from a department are synthesized allowing for instant online consultation. Also, an answer to a particular action can be accompanied by one or more computer files (e.g. reports/ratios, documents, photographs, spreadsheets, etc.).

Another aspect of the present invention is that less time is spent by employees in periodic review meetings because participants (employees) can answer and provide solutions to technical events from their work stations. Also, the classification of technical events or defects by criticality also helps reduce the duration of the periodic meetings. In addition, the ability to visually display action plans at the periodic meetings in real time reduces the possibility that the information discussed is distorted and misinterpreted by participants/employees. Because employees are spending less time in company meetings, they can use this extra time in more productive ways, leading to greater overall efficiency.

Thus, the web-based system of the present invention has several advantages when it is utilized during periodic review meetings. First, a participant can adapt his/her response to be in accordance with the contents of their response stored on the database. Second, any deformation of formulation related to a seizure by a manager is avoided. Lastly, the duration of periodic review meetings is reduced because only consultation of the solution to a technical event is needed.

In an embodiment of the present invention, the web-based system automatically alerts, via e-mail, the participants when an action/response to a technical event is requested in less than 7 days. Also, the web-based system automatically alerts via e-mail the manager of an activity when a response to an action in the web-based system was carried out by a participant. This message can include information about the result obtained. This information allows the manager, in the case of critical problems, to start actions immediately without having to wait for an upcoming periodic review meeting.

An embodiment of the present invention can also have the ability to generate general or customized requests of information relating to technical events or defects. For instance, a field displayed by the web-based system of the present invention can use filters to control the amount of information displayed to a user after the user has made a request. The criteria used by the filters can, for example, be fixed in the requests or edited during the launching of the requests. The result of the request is displayed directly in the web-based system (e.g. lists with direct access to cases, technical events, projects, etc.) or the results can be exported into a spreadsheet, to facilitate distribution of information in a production facility or other organization.

In an embodiment of the present invention, a screen within the Graphical User Interface (GUI) may display a filter page in which a user can modify the information that is displayed to the screen. This function allows a user to tailor the amount of information that is displayed, so that the user does not have to view information that is not important to them. The various filters a user wants to use can be selected, for example, by clicking a box next to the desired filters.

An embodiment of the present invention also allows a user, via the web-based system to search for close or equivalent technical events, defects, or problems which have been previously recorded. Certain technical events may have been the subject of former treatment. Thus, the web-based system makes it possible to attach to current technical events or defects in progress, former similar treatments and the detailed information associated with the previously used treatments.

Another aspect of an embodiment of the present invention is the ability to control the quality of information that is distributed to employees. Capabilities that contribute to the improvement in the quality of communication that occurs during the exchange of information relating to managing and correcting technical events and/or defects associated with the development of products, such as aircraft and aircraft related components and processes, are: the structuring of action plans, the reliability of data inputted to the system, visualization at the periodic review meetings in real time of the action plans by the participants. Ultimately, a unified, synergistic approach to the treatment of a particular technical event via the web-based system improves decision making about the corrective measures that need to take place.

Referring now to the drawings, wherein like reference numerals designate identical or corresponding parts throughout the several views.

FIG. 1 illustrates a diagram of the software and hardware architecture of an embodiment of the present invention. The system's architecture allows for multiple users to work concurrently. Data handling is in a centralized database 101, allowing access by further applications. Database 101, could be, for example, a Transaction-safe table type InnoDB, which can maintain data integrity without data redundancies or inconsistencies. This allows a scaleable architecture, with backup ensured by standard server procedures. The architecture of FIG. 1 may also include a server 104. The server 104 used in an embodiment of the present invention could be, for example, an Apache HTTP webserver with PHP. Also, the server 104 can utilize Server Side Scripting Language, which is easy to extend.

The software and architecture of the embodiment of the present invention as shown in FIG. 1 can also use PHP Extension and Application Repository (PEAR) which is a structured library of open-source code. PEAR provides a database abstraction layer and makes future changes to the database easy. FIG. 1 also shows a thin-client 103. A thin-client can be a computer (client) in a client-server architecture network which depends primarily on a central server for processing activities. The word "thin" refers to the small boot image which such clients typically require, for example no more than is required to connect to a network and start up a dedicated web browser or "Remote Desktop" connection. Other types of clients can be used with the present invention. The end-user device (for example, thin-client 103) shown in FIG. 1 is not limited to a personal computer. The end-user device could be, for example, a PDA or any other device that is capable of connecting to a network and displaying a web browser.

The thin-client 103 shown in FIG. 1 can utilize any standard browser software used on a Windows or Linux based machine. Preferably, the browser runs JavaScript®. The browser could also have the ability to present HTML (HyperText Markup Language) code with cascading style sheets (CSS), so that updates can be realized on a single server. Also, in an embodiment of the present invention instructions stored on the computer program product can be coded in Java, C, C++, Perl, or any other computer programming language. An embodiment of the present invention utilizing a computer program product, can be stored on, for example, a magnetic disk drive, a USB flash drive, a CD-Rom, an optical drive, a floppy disk, or any other computer-readable medium.

As a web-based tool, the system can be accessed using a trans-site intranet/internet. Additional safety could be achieved using restricted access based on a role concept (i.e. giving users different viewing and modification privileges based on their login information).

FIG. 2 illustrates a screen shot of an embodiment of the present invention that can be displayed at one of the clients 103. The Graphical User Interface (GUI) shown in FIG. 2 contains a Primary Navigation Bar 105. The Primary Navigation Bar 105 contains multiple tabs by which a user can navigate to different screens within the GUI. The Primary Navigation Bar 105 could contain, for example, a Status Event tab, Create an Event tab, Search Events tab, and a Export an Event tab. When a user clicks on a tab in the Primary Navigation Bar 105, a different screen is displayed in which the user can perform detailed functions.

FIG. 2 also shows a Main Display Window 107. The Main Display Window 107 displays information about several different technical events in an organized manner. The Main Display Window 107 contains several columns of information. Each column displays a particular area of interest associated with technical events. The columns shown in FIG. 2 are the Number column 109, Criticality column 111, Status column 113, Project column 115, Product column 117, Origin column 119, Cost column 121, Date of Treatment column 123, and the Disposition column 125. Other columns are possible. Information relating to a particular technical event (i.e. case number) can be contained on a horizontal line. Different horizontal lines can display information about different technical events. This feature allows a user to compare different parameters associated with one technical event to the parameters of another technical event.

The various columns of information displayed in FIG. 2 are described next. The first column shown in the Main Display Window 107 is the Number column 109. Technical events can be assigned a case number when information about the technical event is initially inputted into the system. This assignment can be performed automatically by the computer program, for example. Thus, every number shown in the Number column 109 corresponds to a particular technical event. The second column from the left is the Criticality column 111. The Criticality column 111 displays a critical number associated with a particular case number. The criticality number of a given technical event is calculated from three criteria: detectability, frequency, and the severity of the technical event. However, it is envisioned that other criteria could be used as well. As the treatment process of a given technical event progresses, the criticality associated with the technical event decreases.

The third column is the Status column 113. The Status column 113 is capable of displaying several different status indicators for a particular case number. The status indicators could be, for example: Initialized, Pending, Corrected Long Term, and Surveillance. The Initialized status indicator tells a user that a case has been created, but the case is in the beginning stages of treatment. The Pending status indicator tells a user that treatment of the particular technical event or defect is pending. The Corrected Long Term status indicator tells users that the particular technical defect has been corrected long term and the treatment process has been completed. Lastly, the Surveillance status indicator tells a user that the particular case number is being closely monitored.

FIG. 2 also shows a Project column 115. The Project column 115 displays which project is associated with each case number (i.e. technical event). The Product column 117 displays the product associated with the particular case number. The Origin column 119, could, for example, display information about the origin of the particular technical event. The Cost column 121 displays the costs associated with the various case numbers. Next, the Date of Treatment column 123 displays, for example, the date treatment has started for a technical event, or the date treatment has been completed. Lastly, the Disposition column 125 provides information about the disposition of the particular case number. This information could be a date or a status indicator.

When a user clicks on a column heading shown in FIG. 2, the information displayed in that column can be arranged in ascending or descending order. For example, if a user clicks on the Cost column 121 heading, the case number with the largest cost value will be displayed at the top of the list, with the case numbers being arranged in descending order based on cost. Similarly, if the user clicks on the Cost column 121 a second time, the cost information can be displayed in ascending order.

Figure 3:
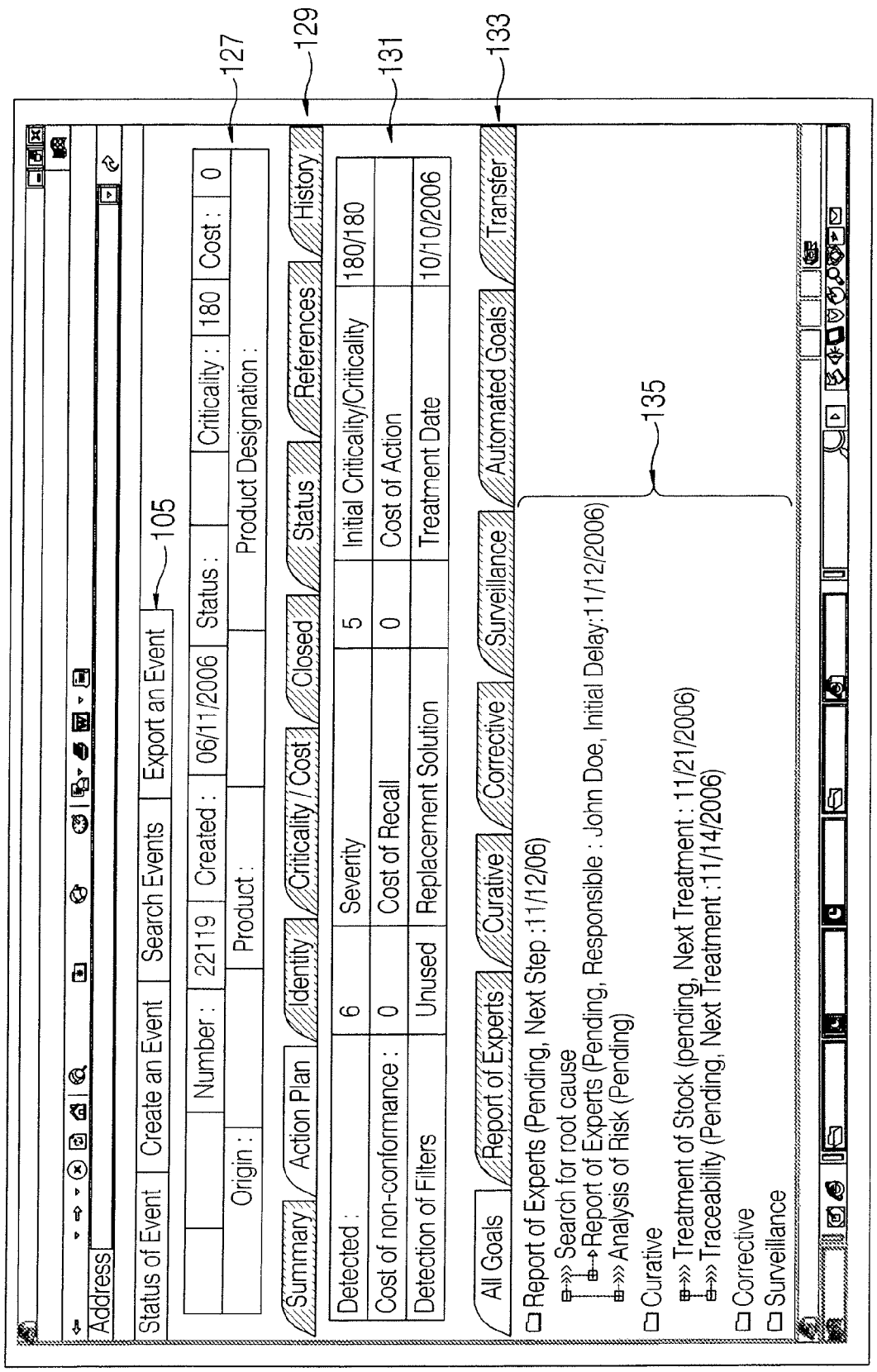
FIG. 3 illustrates a screen shot of an embodiment of the present invention.

FIG. 3 illustrates another screen shot of an embodiment of the present invention. This screen shot can be obtained by selection (by clicking for example) the case number 22119 from the screen shot shown in FIG. 2. The GUI shown in FIG. 3 contains the Primary Navigation Bar 105 at the top of the screen. The Technical Event Overview Window 127 presents a general overview of certain details about a particular case number. The information displayed in the Technical Event Overview Window 127 is similar to the information displayed in the Main Display Window 107 shown in FIG. 2. The Technical Event Overview Window 127 could contain, for example, the date a case for a technical event was created, the status of the technical event, the criticality of the technical event (represented by a critical number), the cost associated with a technical event, the origin of the technical event, the product which is affected by the technical event, and the product designation.

Also shown in FIG. 3 is the Secondary Navigation Bar 129. The Secondary Navigation Bar 129 is located directly below the Technical Event Overview Window 127. However, the Secondary Navigation Bar 129 could be located elsewhere within the GUI. The Secondary Navigation Bar 129 contains several tabs by which a user can display a Sub-window 131 containing information relating to the tab selected. The various tabs contained in the Secondary Navigation Bar 129 could be, for example, a Summary tab, Action Plan tab, Identity tab, Criticality/Cost tab, Closed tab, Status tab, References tab, and History tab. When a user clicks on a tab in the Secondary Navigation Bar 129, a Sub-window 131 is displayed directly below the Secondary Navigation Bar 129. The Sub-window 131 displays detailed information about the subject listed on the tab which was selected by the user.

For example, as shown in FIG. 3, if a user clicks on the Action Plan tab, detailed information about the action plan of a particular case number is displayed. The Sub-window 131 then displays detailed information about the action plan for the particular case number of interest. As shown in FIG. 3, the information displayed in the Sub-window 131 could be the number of technical events detected, the severity of the technical event, the initial criticality of the technical event, the current criticality of the technical event, the cost of nonconformance, cost of a recall, cost of action, detection of filters, treatment date, and a replacement solution.

Also shown in FIG. 3 is the Tertiary Navigation Bar 133. The Tertiary Navigation Bar 133 is located directly below the Sub-window 131 and is laid out in a similar fashion as the Secondary Navigation Bar 129. A user can navigate the Tertiary Navigation Bar 133 in the same way the user navigates the Secondary Navigation Bar 129. The Tertiary Navigation Bar 133 contains several different tabs, each tab marked with a heading. The Tertiary Navigation Bar 133 can contain, for example, an All Goals tab, a Report of Experts tab, a Curative tab, a Corrective tab, a Surveillance tab, an Automated Goals tab, and Transfer tab. When a user clicks on a particular tab in the Tertiary Navigation Bar 133, detailed information pertaining to the heading listed on the tab is displayed in the Detailed Information Window 135. The Detailed Information Window 135 is located directly below the Tertiary Navigation Bar 133.

In FIG. 3, a user has clicked on the All Goals tab. Thus prompting technical event goal information to be displayed in the Detailed Information Window 135. The information displayed in the Detailed Information Window 135 is displayed in a hierarchical folder structure. Within a main folder various subtopics are listed. If a user clicks on the plus sign icon next to a topic, more subtopics will be displayed. This functionality allows a user to modify the amount of information that is displayed to them. The information displayed in the Detailed Information Window 135 could be, but is not limited to, the steps taken to address the technical event or defect, similar instances of the technical event, who is responsible for the treatment of the technical event, which department or departments are involved with the treatment process, the tasks to be performed, and the tasks already performed.

Figure 4:
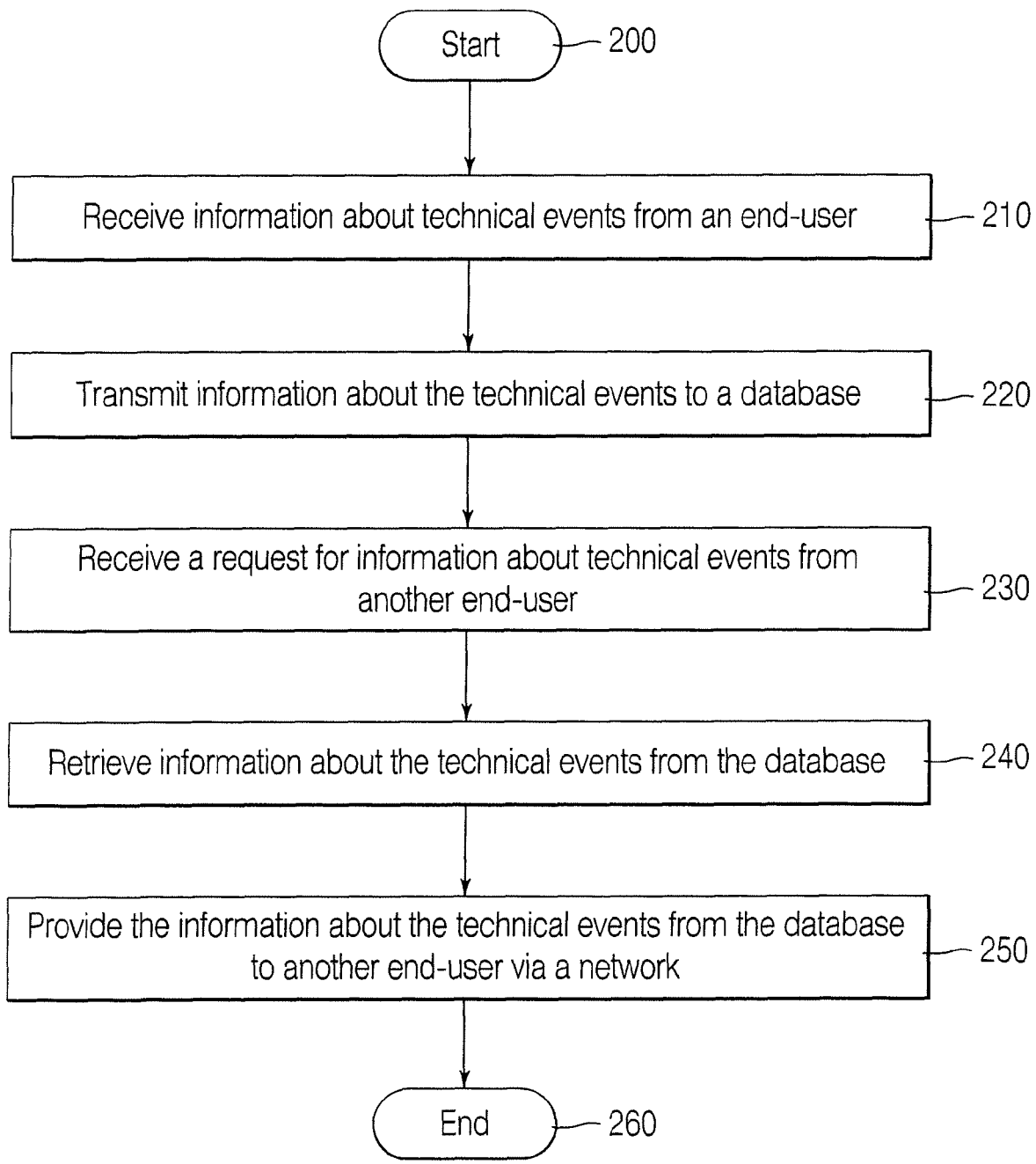
FIG. 4 shows a flow chart of an embodiment of the present invention.

FIG. 4 shows a flow chart of an embodiment of the present invention. Step 200 indicates the start of the flow chart. In step 210, the system, for example the server 104, receives information about technical events from an end-user. Next, in step 220, the information about the technical events that was just received is transmitted, for example by the server 104, to a database. In step 230, the system, for example the server 104, receives a request for information about technical events from another end-user (i.e. not the end-user in step 210). In step 240, the system, for example the server 104, retrieves information about the technical events, which was just requested, from the database. Lastly, in step 250, the system, for example the server 104, provides the requested technical event information from the database to the end-user which requested the information, via a network. Step 260 indicates the end of the flow chart.

Obviously, numerous modifications and variations of the present invention are possible in light of the above teachings. It is therefore to be understood that within the scope of the appended claims, the invention may be practiced otherwise than as specifically described herein.

The invention claimed is:

1. A system for managing and tracking technical events associated with production of aircraft and aircraft-related components, the system comprising:
   a database configured to store quality assurance information about said technical events associated with said production of aircraft and aircraft-related components;
   an end-user connected to said database via a network;
   a server connected to said network, said server being configured to manage said quality assurance information about said technical events between said database and said end-user; and
   a web-based graphical user interface configured to display, at said end-user, said quality assurance information, and to arrange and display said technical events in order of importance based upon a critical number which is associated with said technical events, a number value of said critical number is indicative of the relative importance of the technical event, said server is configured to determine said number value of said critical number based on frequency of said technical event, severity of said technical event, and detectability of said technical event, and after one technical event is cured, said server changes said critical number associated with said one technical event, and said web-based graphical user interface displays an updated critical number,
   wherein said quality assurance information includes a case number, said critical number, and status information about one of said technical events associated with the production of the aircraft and the aircraft related components.

2. The system of claim 1, wherein said quality assurance information includes an origin of one particular technical event, cost associated with said one technical event, and disposition of said one technical event associated with the production of the aircraft and the aircraft related components.

3. The system of claim 1, wherein said web-based graphical user interface is configured to display a status of corrective action for said technical events.

4. The system of claim 1, wherein a higher value of said critical number indicates greater importance of the technical event.

5. A method of managing and tracking technical events during production of aircraft and aircraft-related components via a web-based system including a processor, the method comprising:
   receiving information about said technical events from an end-user;
   transmitting said information about said technical events to a database;
   receiving a request from another end-user;
   retrieving said information about said technical events from said database;
   providing quality assurance information about said technical events to said another end-user via a network;
   arranging and displaying said technical events in order of importance based upon a critical number which is associated with said technical events, a number value of said critical number is indicative of the relative importance of the technical event, and said number value of said critical number is determined based on frequency of said technical events, severity of said technical event, and detectability of said technical event;
   changing said critical number of one technical event after said one technical event is cured; and
   displaying by said web-based graphical user interface an updated critical number,
   wherein said quality assurance information includes a case number, said critical number, and status information about one of said technical events associated with the production of the aircraft and the aircraft related components.

6. A method according to claim 5, wherein said providing further comprises providing to said end-user quality assurance information including an origin of said one technical event, cost associated with said one technical event, and disposition of said one technical event.

7. A method according to claim 5, wherein said providing further comprises providing to said end-user a status of corrective action for said technical events.

8. A method according to claim 5, wherein said changing said critical number is decreasing said critical number.

9. The method according to claim 5, wherein a higher value of said critical number indicates greater importance of the technical event.

10. A non-transitory computer-readable storage medium encoded by instructions which when executed by a computer cause a processor to execute a method for managing and tracking technical events during the production of aircraft and aircraft related components, the method comprising:
   receiving information about said technical events from an end-user;
   transmitting said information about said technical events to a database;
   receiving a request from another end-user;
   retrieving said information about said technical events from said database;
   providing quality assurance information about said technical events from said database to said another end-user via a network;
   arranging and displaying said technical events in order of importance based upon a critical number which is associated with said technical events, a number value of said critical number is indicative of the relative importance of the technical event, and said number value of said critical number determined based on frequency of said technical events, severity of said technical event, and detectability of said technical event;
   changing said critical number of one technical event after said one technical event is cured; and
   displaying by said web-based graphical user interface an updated critical number, wherein said quality assurance information includes a case number, said critical number, and status information about one of said technical events associated with the production of the aircraft and the aircraft related components.

11. The non-transitory computer-readable storage medium of claim 10, wherein said providing further comprises providing to said end-user quality assurance information including an origin of said one technical event, cost associated with said one technical event, and disposition of said one technical event.

12. The non-transitory computer-readable storage medium of claim 10, wherein said providing further comprises providing to said end-user a status of corrective action for said technical events.

13. The non-transitory computer-readable storage medium of claim 10, wherein said changing said critical number after said one technical event is decreasing said critical number.

14. The non-transitory computer-readable storage medium of claim 10, wherein a higher value of said critical number indicates greater importance of the technical event.

\* \* \* \* \*